United States Patent
Yang et al.

(10) Patent No.: US 12,074,285 B2
(45) Date of Patent: Aug. 27, 2024

(54) AQUEOUS POLYMER ELECTROLYTE FOR LITHIUM RECHARGEABLE BATTERY

(71) Applicants: TOYOTA JIDOSHA KABUSHIKI KAISHA, Toyota (JP); SHANGHAI JIAO TONG UNIVERSITY, Shanghai (CN)

(72) Inventors: Jun Yang, Shanghai (CN); Zhixin Xu, Shanghai (CN); Yixi Kuai, Shanghai (CN); Koji Suto, Mishima (JP)

(73) Assignees: TOYOTA JIDOSHA KABUSHIKI KAISHA, Toyota (JP); SHANGHAI JIAO TONG UNIVERSITY, Shanghai (CN)

( * ) Notice: Subject to any disclaimer, the term of this patent is extended or adjusted under 35 U.S.C. 154(b) by 219 days.

(21) Appl. No.: 17/457,971

(22) Filed: Dec. 7, 2021

(65) Prior Publication Data
US 2022/0190385 A1 Jun. 16, 2022

(30) Foreign Application Priority Data
Dec. 11, 2020 (CN) .......................... 202011460961.2

(51) Int. Cl.
*H01M 10/056* (2010.01)
*H01M 10/052* (2010.01)
(Continued)

(52) U.S. Cl.
CPC ..... *H01M 10/0565* (2013.01); *H01M 10/052* (2013.01); *H01M 10/44* (2013.01);
(Continued)

(58) Field of Classification Search
CPC ........... H01M 10/052; H01M 10/0525; H01M 10/056–0569; H01M 2300/0002–0014
See application file for complete search history.

(56) References Cited

U.S. PATENT DOCUMENTS

| 2003/0215716 | A1* | 11/2003 | Suzuki | ................ H01M 4/0404 429/234 |
| 2012/0129045 | A1* | 5/2012 | Gin | ................... H01M 10/0565 429/189 |

(Continued)

FOREIGN PATENT DOCUMENTS

| JP | 2018-156895 A | 10/2018 |
| WO | 2016/129668 A1 | 8/2016 |

(Continued)

OTHER PUBLICATIONS

Meziane (Rachid Meziane et al., "Single-ion polymer electrolytes based on a delocalized polyanion for lithium batteries", Electrochimica Acta 57 (2011) p. 14-19) (Year: 2011).*

(Continued)

*Primary Examiner* — Jeremiah R Smith
(74) *Attorney, Agent, or Firm* — Sughrue Mion, PLLC

(57) ABSTRACT

The present disclosure provides an aqueous polymer electrolyte comprising a polymer electrolyte of a polymer of a single lithium salt, or a polymer of a single lithium salt and short-chain dimethylsiloxane or single fluoro ether, and water. The present disclosure further provides a lithium rechargeable battery comprising such an aqueous polymer electrolyte.

8 Claims, 1 Drawing Sheet

(51) Int. Cl.
 *H01M 10/0565* (2010.01)
 *H01M 10/44* (2006.01)
(52) U.S. Cl.
 CPC ............... *H01M 2300/0082* (2013.01); *H01M 2300/0085* (2013.01)

(56) References Cited

U.S. PATENT DOCUMENTS

2016/0190641 A1* 6/2016 Lee .................. C08F 212/30
 429/188
2018/0277885 A1 9/2018 Takami et al.
2021/0135290 A1* 5/2021 Lee .................... H01M 50/434

FOREIGN PATENT DOCUMENTS

WO WO-2019002216 A1 * 1/2019
WO WO-2019059053 A1 * 3/2019 ................ C08J 3/24

OTHER PUBLICATIONS

Yan Dissertation; (Dissertation of Chaoyi Yan, "Advanced Composite Solid Electrolyte Designs Toward High-performance All-solid-state Li Batteries", A dissertation submitted to the Graduate Faculty of North Carolina State University . . . ; published Dec. 16, 2019) (Year: 2019).*
Chongyin Yang et al., "4.0V Aqueous Li-Ion Batteries", Cell Press, Sep. 6, 2017, pp. 122-132, Joule 1.

\* cited by examiner

AQUEOUS POLYMER ELECTROLYTE FOR LITHIUM RECHARGEABLE BATTERY

BACKGROUND

1. Field

The present disclosure belongs to the field of energy material production and electrochemistry and, specifically, relates to an aqueous polymer electrolyte for high energy lithium rechargeable batteries, a preparation method and use of the same.

2. Description of Related Art

In order to increase an energy density of a battery, lithium metals and silicon having a very high specific capacity and a low operating voltage have been widely studied as negative electrode materials. At present, liquid organic electrolytes such as a carbonate electrolyte are known as those compatible with lithium metal and silicon negative electrodes. However, these liquid organic electrolytes have an unignorable safety issue.

Use of an aqueous electrolyte can fundamentally solve the safety issue of organic electrolytic solutions and cut down the production costs. Aqueous rechargeable batteries that use an aqueous electrolyte are pollution-free, green and safe batteries and have enhanced safety during use and production. Additionally, aqueous batteries have advantages of high output, good magnification performance and long cycle life which have drawn attention as a research subject in recent years. However, aqueous batteries have much lower operating voltage and energy density than commercial lithium rechargeable batteries due to a narrow electrolyte potential window, and the usage thereof has been significantly restricted. Recent studies have revealed that the controlled interface between an electrode/aqueous electrolytic solution lowers a water activity level and widens a potential window of the aqueous electrolyte. Wang et al. proposed an electrolyte concept called "Water-in-Salt" and widened a potential window of a battery from 1.23 V to 2.3 V by using a 21 M electrolytic solution (Science, 2015, 350, 938). Since then, electrolytic solutions of high salt concentrations were successively reported, and the energy density of aqueous lithium rechargeable batteries has been improved to a certain extent but is still much lower than the energy density of commercial lithium rechargeable batteries. The reason for this is conceived as follows. A significantly increased oxidation potential of an electrolyte of a high salt concentration enables the use of a positive electrode material of a higher specific capacity. On the other hand, a positive electrode capacity of a generally used metal oxide failed to significantly enhance the energy density of a battery and the reduction potential of the electrolyte was not much widened. For this reason, electrodes of very high specific capacity of lithium metals and lithium alloys were not usable. A piece of literature documents that when the electrode surface is coated with a hydrophobic colloidal electrolyte, these low operating voltage negative electrodes suitably cycle in an aqueous electrolytic solution of a high salt concentration. However, such a battery system only maintains a short-term cycle stability (up to 50 cycles) and requires extremely complicated battery assembly, whereby further considerations on practicality need to be given.

Given the above, the electrochemical performance of aqueous lithium rechargeable batteries is affected by, as a whole, the positive and negative electrode materials and an electrolyte, and an electrolyte of a wide potential window and an interfacial characteristic are the key. An aqueous electrolyte system adaptable to lithium metals and silicon negative electrodes having a high capacity and a low operating voltage and capable of assuring long-term cycle stability has not been reported. Thus, aqueous lithium rechargeable batteries having a high energy are much awaited.

SUMMARY

An object of the present disclosure is to provide an aqueous polymer electrolyte capable of solving the problems posed by the conventional aqueous electrolytes such as a narrow potential window and low cycle stability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is an aqueous polymer electrolyte comprising a polymer electrolyte of a polymer of a single lithium salt, or a polymer of a single lithium salt and short-chain dimethylsiloxane or single fluoro ether, and water.

In an embodiment, the aqueous polymer electrolyte of the present disclosure is a polymer of a single lithium salt and selected from poly lithium (p-vinylbenzenesulfonyl) (trifluoromethylsulfonyl)imide (poly LiSTFSI), poly lithium p-styrene sulfonyl N-[(trifluoromethyl)oxide[[(trifluoromethyl)sulfonyl group]amino]-4-sulfonyl group]-imide (poly LiSsTFSI), and poly lithium sulfonyl(trifluoromethane sulfonyl)imide methacrylate (1:1) (polyLiMTFSI), or a combination thereof.

The polymer electrolyte is a polymer obtained by polymerizing the single lithium salt and short-chain dimethylsiloxane or single fluoro ether, wherein a content of the short-chain dimethylsiloxane or single fluoro ether is 20 mol % or less relative to the total amount of the single substances. It is preferably contained in 1 to 20 mol %, and further preferably contained in 5 to 10 mol %. The single lithium salt is selected from LiSTFSI, LiSsTFSI, and LiMTFSI, represented by the following formulae.

[Formula 1]

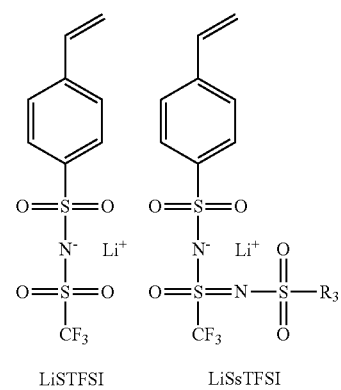

LiSTFSI          LiSsTFSI

-continued

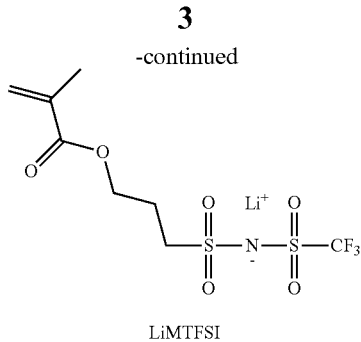

LiMTFSI

The short-chain dimethylsiloxane and the single fluoro ether are represented by the following formulae (A) and (B).

[Formula 2]

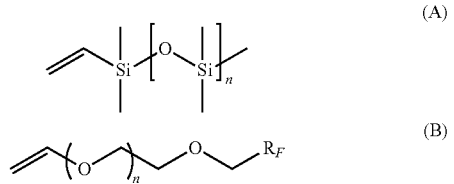

wherein in Formula (A) and Formula (B), n is an integer of 1 to 10, preferably an integer of 1 to 5, and in Formula (B), RF is perfluoroalkyl represented by —$(CF_2)mCF_3$, and m=0, 1, 2, or 3.

In the aqueous polymer electrolyte of the present disclosure, a content of the water is 5 to 30 mass %.

The aqueous polymer electrolyte of the present disclosure is formed into a film and, specifically, a film whose thickness is 20 to 150 μm.

The present disclosure further relates to a lithium rechargeable battery comprising the above aqueous polymer electrolyte.

The aqueous polymer electrolyte of the present disclosure has excellent flame retardancy and an industrially applicable high mechanical strength, and thus can be used for high energy rechargeable batteries thereby providing a high potential window and good cycle stability.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
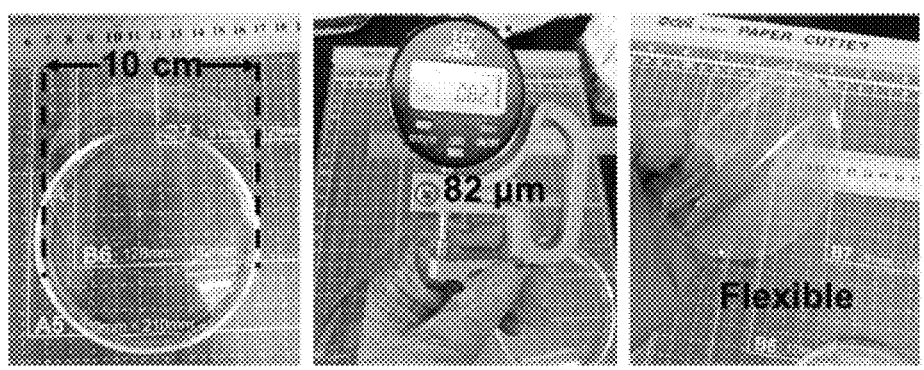
FIG. 1 is a photograph of an aqueous LiPSTFSI polymer film.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

The aqueous polymer electrolyte of the present disclosure is composed of a polymer electrolyte and water. The polymer electrolyte is obtained by polymerizing a rigid single lithium salt. The aqueous polymer electrolyte is preferably obtained by copolymerizing a single lithium salt and flexible short-chain dimethylsiloxane or single fluoro ether. The aqueous polymer electrolyte of the present disclosure is used in the form of a film for a battery. In this case, the single lithium salt is the main body structure of the polymer and functions for transporting lithium ions. The addition of a flexible segment not only enhances the flexibility of the electrolyte but also enhances the flame retardancy of the electrolyte and thereby completely solves the safety issue of batteries that use such a polymer. The combination of the rigid single lithium salt and a flexible segment imparts good flexibility and an industrially applicable high mechanical strength to the polymer. In the polymer electrolyte, water molecules enhance the transport rate of lithium ions and increase the ionic conductivity, thereby improving drawbacks such as low operating performance of a solid-state battery that uses such a polymer. When a water content of the polymer film is adjusted by hydrophilic lithium salt molecules and a hydrophobic dimethylsiloxane or fluoro ether segment to completely fix water molecules around the lithium salt in the electrolyte, the activity of water molecules significantly decreases. Accordingly, the potential window expansion of the aqueous electrolyte can be achieved.

According to studies, the higher a content of the flexible short-chain moiety in the aqueous polymer electrolyte, the more flexible the electrolyte film becomes. However, the conductivity decreases after being increased. On the other hand, the higher a content of water in the aqueous polymer electrolyte, the higher an ionic conductivity but a potential window is reduced. In the aqueous polymer electrolyte of the present disclosure, the preferable proportion of the rigid lithium salt moiety and a flexible short-chain polydimethylsiloxane or fluoro ether moiety is such that the short-chain polydimethylsiloxane or fluoro ether moiety accounts for 0 to 20%, for example, 1 to 20%, and preferably 5 to 10%, relative to the total molar quantity. The preferable range of the water content in the aqueous polymer electrolyte is 5 to 30 mass %, and preferably 10 to 15 mass %.

As described above, the polymer in the aqueous polymer electrolyte of the present disclosure is a lithium salt polymer formed by polymerizing a single lithium salt and includes poly lithium (p-vinylbenzenesulfonyl)(trifluoromethylsulfonyl)imide (poly LiSTFSI) and derivatives thereof, poly lithium p-styrene sulfonyl N-[(trifluoromethyl)oxide[[(trifluoromethyl)sulfonyl group]amino]-4-sulfonyl group]-imide (poly LiSsTFSI), and poly lithium sulfonyl(trifluoromethane sulfonyl)imide methacrylate (1:1) (poly LiMTFSI), and the molecular structure formulae of single lithium salts for forming these polymers are as follows.

[Formula 3]

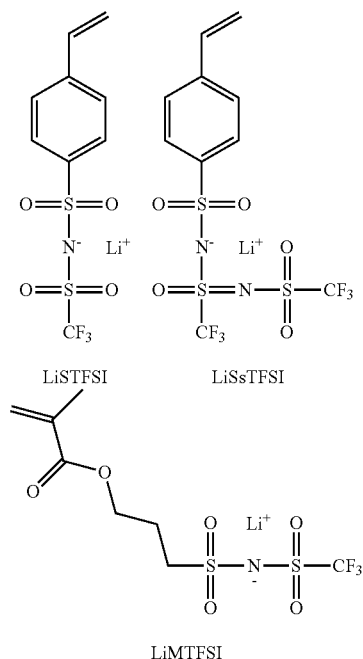

The polymer in the aqueous polymer electrolyte can be a copolymer obtained by copolymerizing a single lithium salt and flexible short-chain dimethylsiloxane or fluoro ether, and the molecular structure formula of the short-chain dimethylsiloxane (PDMS) or single fluoro ether (PEOF) is as follows.

[Formula 4]

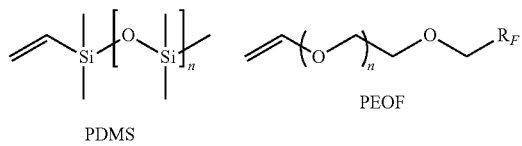

In PDMS and PEOF, n is an integer of 1 to 10, preferably 1 to 5, RF is perfluoroalkyl represented by $-(CF_2)mCF_3$, and m is 0, 1, 2, or 3.

The above single lithium salts and the polymers thereof, and PDMS and PEOF can be commercial products, and the single lithium salts and the polymers thereof can be synthesized in house.

EXAMPLES

The preparation and advantages of the aqueous polymer electrolyte film of the present disclosure will be described below along with Examples.

Preparation Method of Aqueous Electrolyte Film

Polymerization: in accordance with a literature (Electrochimica Acta 2013, 93 254.), a LiSTFSI single lithium salt was prepared (LiSsTFSI and LiMTFSI single lithium salts can be synthesized in the same manner). This single substance and flexible short-chain single PDMS or PEOF were mixed in a certain ratio (the flexible short-chain single substance was 0 to 20% of the total number of moles of single substances) and then dissolved in a DMF solvent, and an initiator AIBN (0.5 to 2 mass %) was added at 60 to 80° C. to cause free radical polymerization. The polymerization time is 2 to 12 hours. After completion of the polymerization reaction, methanol was added to dilute the reaction system. Subsequently, the polymer was precipitated with ether and purified, thereby obtaining the polymer having a molecular weight of 200,000 to 300,000. The molecular weight of a polymer can be adjusted by the temperature and the amount of an initiator added. As a temperature increases, a content of an initiator decreases and a molecular weight increases. The reverse is also true.

Film formation: the obtained polymer is dissolved in an appropriate amount of water (such as deionized water) and allowed to stand in the air to evaporate excess water, thereby obtaining a clear polymer film with controllable flexibility, size, and thickness. The film thickness is controlled to typically 20 to 150 μm, and the water content to 5 to 30%. With this water content, the polymer is safe and non-flammable.

Electrochemical Performance Test Method

The obtained film was cut out in a disc-shape having a diameter of 2 cm to evaluate a potential window, a conductivity, and the compatibility with an electrode using a button battery. The potential window was directly determined by measuring cyclic voltammetry (CV) with a lithium-stainless electrode (Li-SS) battery. The conductivity (1/ρ) was determined by measuring impedance with a stainless-stainless symmetric battery and calculated by the formula R=ρL/s. For the compatibility with the electrode, a battery was assembled using the aqueous polymer film as an electrolyte with a silicon negative electrode or a lithium metal negative electrode and a ternary positive electrode or a lithium iron phosphate positive electrode, and the charge/discharge cycle performance of the battery was measured.

Example 1

In accordance with the above preparation method of the aqueous electrolyte film, an aqueous LiPSTFSI polymer electrolyte in the form of a film was obtained from LiSTFSI single lithium salt. The measurement showed that such a flexible film had a water content of 15 mass % and a thickness of 70 μm. A photograph of the obtained flexible film is shown in FIG. 1.

Figure 2:
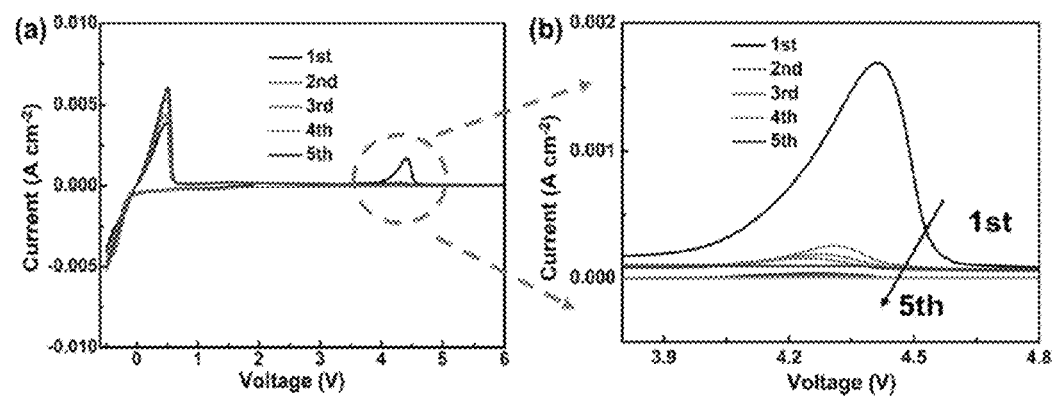
FIG. 2 shows a cyclic voltammetry (CV) test of the aqueous LiPSTFSI polymer film, wherein section (b) is an enlarged view of the area circled in section (a).

The ionic conductivity of the LiPSTFSI polymer aqueous electrolyte, when measured in accordance with the electrochemical performance test method described above, was about $0.5\times10^{-4}$ Scm$^{-1}$. The polymer in the present Example is a single ion conductor with a lithium ion mobility of close to 1. For this reason, the polymer has about the same lithium ion conductivity order as generally used liquid electrolytes. As a result of measuring the potential window of this aqueous polymer electrolyte, it was confirmed, as shown in FIG. 2, that the reduction potential of the electrolyte was significantly widened. Further, no hydrogen precipitation was detected even at 0 V. The oxidation potential of the electrolyte reached 4.2 V, and when the number of cycles increased to 5 cycles, the oxidation peak at 4.35 V gradually disappeared whereby the oxidation potential was widened to 6 V.

Example 2

In accordance with the above method, a film aqueous polymer electrolyte LiPSTFSI having a water content of 22% and a thickness of 75 μm was created. The ionic conductivity measured at room temperature was $8 \times 10^4$ Scm$^{-1}$, the reduction potential was close to 0.5 V, and the reduction potential of the electrolyte reached 4.2 V, and after 6 cycles, the oxidation potential was widened to 5 V.

Example 3

In accordance with the above method, a film aqueous polymer electrolyte LiPSTFSI having a water content of 10% and a thickness of 85 μm was created. The ionic conductivity measured at room temperature was $0.3 \times 10^4$ Scm$^{-1}$, the reduction potential was close to 0 V, and the oxidation potential of the electrolyte reached 4.4 V, and after 4 cycles, the oxidation potential was widened to 6 V.

Example 4

In accordance with the above method, a film aqueous polymer electrolyte LiPSTFSI having a water content of 16% and a thickness of 90 μm was created. The ionic conductivity measured at room temperature was close to $3 \times 10^4$ Scm$^{-1}$, the reduction potential was close to 0 V, and the oxidation potential of the electrolyte reached 4.1 V, and after 5 cycles, the oxidation potential was widened to 5.8 V.

Example 5

In accordance with the above method, a film aqueous polymer electrolyte LiPSTFSI having a water content of 14% and a thickness of 75 μm was created. The ionic conductivity measured at room temperature was close to $1 \times 10^{-4}$ Scm$^{-1}$, the reduction potential was close to 0 V, and the oxidation potential of the electrolyte reached 4.3 V, and after 5 cycles, the oxidation potential was widened to 6 V.

As described above, the polymers were obtained from the single lithium salt in Examples 1 to 5. In the following Examples 6 to 10, polymers were obtained by copolymerizing a single lithium salt and single PDMS or single PEOF.

Example 6

LiSTFSI and 5% (accounting for 5% mol of the whole) PDMS (n of this single substance is 5) were copolymerized to obtain a film aqueous polymer electrolyte PLiSTFSI-PDMS. This film electrolyte has a water content of 15%, a thickness of 60 μm, an ionic conductivity at room temperature of $5 \times 10^{-4}$ Scm$^{-1}$, and a reduction potential close to 0 V. The oxidation potential of the electrolyte reached 4.4 V, and after 5 cycles, the oxidation potential was widened to 6 V.

Example 7

LiSTFSI and 5% PEOF (n and m of this single substance are 5 and 2, respectively) were copolymerized thereby obtaining a film aqueous polymer electrolyte PLiSTFSI-PEOF. This film electrolyte has a water content of 15%, a thickness of 58 μm, an ionic conductivity measured at room temperature of $8 \times 10^4$ Scm$^{-1}$, and a reduction potential close to 0 V. The oxidation potential of the electrolyte reached 4.4 V, and after 4 cycles, the oxidation potential was widened to 6 V.

Example 8

A battery obtained by assembling the aqueous polymer electrolyte PLiSTFSI-PEOF obtained in Example 7, a lithium metal negative electrode, and a lithium iron phosphate positive electrode was capable of normally cycling at 0.5 C for 50 cycles at room temperature and had a capacity retention of 85%.

Example 9

A battery obtained by assembling the aqueous polymer electrolyte PLiSTFSI-PEOF (different from Example 8 in the aspect of a water content being 17%), a graphite negative electrode, and a LiFePO$_4$ positive electrode was capable of normally cycling at 0.5 C for 60 cycles at room temperature and had a capacity retention of 90%.

Example 10

A battery obtained by assembling an aqueous polymer electrolyte PLiSTFSI-PEOF (different from Example 8 in the aspect of a water content being 16%), a silicon negative electrode, and a Li[Ni$_{1/3}$Co$_{1/3}$Mn$_{1/3}$]O$_2$ positive electrode was capable of normally cycling at 0.5 C for 55 cycles at room temperature and had a capacity retention of 88%.

The aqueous polymer electrolytes according to the embodiments of the present disclosure have the following performances. (1) The ionic conductivity at room temperature is more than $10^4$ Scm$^{-1}$, the potential window of 5 V is achieved, and further good flame retardancy and an industrially applicable high mechanical strength are imparted. (2) The interface between the negative electrode and the electrolyte is controllable, and the impact of water on the lithium metal and the silicon electrode can be reduced. (3) Long-term electrochemical compatibility and good electrode/electrolyte interface stability can be achieved with the optimized lithium or silicon negative electrode and the high voltage ternary positive electrode.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An aqueous polymer electrolyte, comprising:

a polymer electrolyte; and water, wherein the polymer electrolyte is a polymer obtained by polymerizing a single lithium salt with a short-chain dimethylsiloxane or with single fluoro ether, wherein the short-chain dimethylsiloxane or the single fluoro ether is contained in 20 mol % or less relative to the total amount of single substances, wherein the single lithium salt is selected from the group consisting of lithium (p-vinylbenzenesulfonyl)(trifluoromethylsulfonyl)imide (LiSTFSI), lithium p-styrene sulfonyl N-[(trifluoromethyl)oxide[[(trifluoromethyl)sulfonyl group]amino]-4-sulfonyl group]-imide (LiSsTFSI), and lithium sulfonyl(trifluoromethane sulfonyl)imide methacrylate (LiMTFSI), represented by the following formulae:

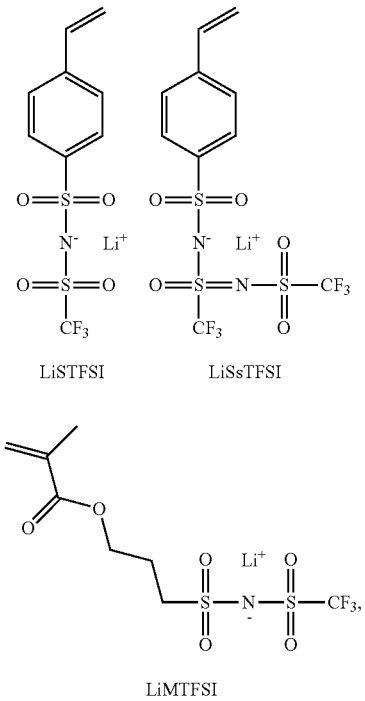

LiSTFSI     LiSsTFSI

LiMTFSI and wherein the short-chain dimethylsiloxane and the single fluoro ether are respectively represented by the following formulae (A) and (B):

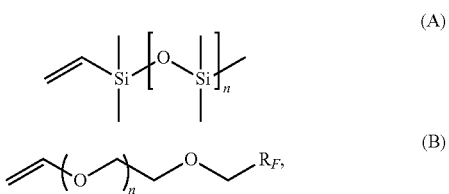

wherein, in Formula (A) and Formula (B), n is an integer of 1 to 10, and in Formula (B), RF is perfluoroalkyl represented by $-(CF_2)mCF_3$, and m=0, 1, 2, or 3.

2. The aqueous polymer electrolyte according to claim 1, wherein a content of the water is 5 to 30 mass %.

3. The aqueous polymer electrolyte according to claim 1, wherein the aqueous polymer electrolyte is formed into a film.

4. The aqueous polymer electrolyte according to claim 3, wherein the film has a thickness of 20 to 150 μm.

5. The aqueous polymer electrolyte according to claim 1, wherein in Formula (A) and Formula (B), n is an integer of 1 to 5.

6. The aqueous polymer electrolyte according to claim 1, wherein the short-chain dimethylsiloxane or the single fluoro ether is contained in 1-20 mol % relative to the total amount of single substances.

7. A lithium rechargeable battery comprising the aqueous polymer electrolyte according to claim 1.

8. A method for producing the aqueous polymer electrolyte, comprising dissolving the aqueous polymer according to claim 1 in water and volatilizing water to a predetermined content.

* * * * *